US009225143B1

(12) United States Patent
Murray

(10) Patent No.: US 9,225,143 B1
(45) Date of Patent: Dec. 29, 2015

(54) POLARIZATION SCRAPING METHOD AND SYSTEM FOR UNIDIRECTIONAL ROTATIONAL MODE SELECTION WITHIN A LASER CAVITY

(71) Applicant: Arete Associates, Northridge, CA (US)

(72) Inventor: James Thomas Murray, Longmont, CO (US)

(73) Assignee: Arete Associates, Northridge, CA (US)

( * ) Notice: Subject to any disclaimer, the term of this patent is extended or adjusted under 35 U.S.C. 154(b) by 0 days.

(21) Appl. No.: 13/970,236

(22) Filed: Aug. 19, 2013

Related U.S. Application Data

(63) Continuation of application No. 13/304,305, filed on Nov. 23, 2011, now Pat. No. 8,514,906.

(60) Provisional application No. 61/417,257, filed on Nov. 25, 2010.

(51) Int. Cl.
*H01S 3/08* (2006.01)
*H01S 3/083* (2006.01)
*H01S 3/11* (2006.01)

(52) U.S. Cl.
CPC .. *H01S 3/083* (2013.01); *H01S 3/11* (2013.01)

(58) Field of Classification Search
CPC ............. H01S 3/00; H01S 3/02; H01S 3/034; H01S 3/07–3/08; H01S 3/08004; H01S 3/08027; H01S 3/08036; H01S 3/08054; H01S 3/081; H01S 3/0813; H01S 3/0816; H01S 3/083; H01S 3/09; H01S 3/11
USPC .................. 372/29.011, 29.02, 29.022, 92, 94
See application file for complete search history.

(56) References Cited

U.S. PATENT DOCUMENTS 3,486,130 A * 12/1969 Macek ............................ 372/94
4,085,825 A * 4/1978 Scarborough .................. 188/378
5,043,998 A * 8/1991 Cooper et al. .................. 372/95

* cited by examiner

*Primary Examiner* — Dung Nguyen
(74) *Attorney, Agent, or Firm* — Furman IP Law

(57) ABSTRACT

A compact laser is provided for in accordance with an exemplary embodiment in the present disclosure includes a compact resonator structure using a non-planar geometry of bulk components. The laser includes a preferred rotational direction of lasing modes and employs bulk components for establishing the preferred rotational direction of lasing modes within resonator. In some embodiments, the preferred rotational direction of lasing modes is established using a reflective element that is outside the resonator structure. In some embodiments, the reflective element induces polarization shifts in the reflected light that are compensated for by a wave plate, which may be outside the resonator structure.

8 Claims, 16 Drawing Sheets

Vendor: LaserTel, Tucson, AZ

| 1.2kW S4-G6 QCW array package specifications | LT-5500-01-1414 | | | |
|---|---|---|---|---|
| Parameter | MIN | TYP | MAX | Units |
| Peak Output Power | | 1200 | | W |
| Peak Wavelength | 805 | 808 | 811 | nm |
| Individual array peak wavelength distribution within a lot* | | | 3 | nm |
| Number of Bars | | 6 | | |
| Bar Pitch | | 0.4 | | mm |
| Emission Area | | 10 x 2.0 | | mm |
| Beam Divergence | | | | |
| Fast Axis (FWHM) | | 32 | 38 | ° |
| Slow Axis (FWHM) | | 10 | 12 | ° |
| Spectral Width (FWHM) | | 3.0 | 3.5 | nm |
| Aggregate Spectral Width within a lot (FWHM)* | | | 6 | nm |
| Operating Current (Iop) | | 235 | 240 | A |
| Frequency | | 60 | | Hz |
| Pulse Width | | 250 | | μsec |
| Threshold Current | | 35 | 38 | A |
| Conversion Efficiency | 40 | 45 | | % |
| Operating Temperature | | 58 | | °C |
| Operating Voltage | | 11 | 12 | V |
| Wavelength Temp. Coefficient | | 0.3 | | nm/°C |
| Absolute Maximum Ratings | | | | |
| Operating Current | | | 250 | A |
| Pulse Width | | | 250 | μsec |
| Duty Cycle | | | 1.5 | % |
| Reverse Voltage | | | 3.0 | V |
| Storage Temperature | -40 | | +85 | °C |
| Operation Temperature (non-condensing) | -5 | | +60 | °C |

*Lot defined as 2 stacks

Fig. 9

| Item | Description |
|---|---|
| Mirrors (non-OC) (Non-Output Coupling) | High reflecting mirrors at 1064 nm / ~ 10 mm diameter |
| Pockel Cell | 4x4x20 mm BBO Crystal |
| Polarizer | High contrast ratio, high damage threshold polarizaer |
| Waveplate | ~ 3/5λ at 1064 nm, zero order, 5 mm diameter |
| Corner Cube | 5 mm diameter |
| "Coffin" Gain Module (Irregular Hexagon) | 3x3x30 mm Nd(1%) core Sm(5%) cladding Reflective wings either mirror or coatings on monolithic assembly |
| Pump Diode | LT-5500-01-1414- 1200, 1200 W, QuasiCW 2x10 mm exit aperture |

Fig. 11

```
*************** System Information ***************     *************** Generated Heat ***************

Host Crystal = Nd:YAG                                   Generated Heat Power = 4. W
Laser Wavelength = 1.064 um                             Generated Heat Energy = 80.3 mJ
Cavity Length = 150. mm
Host Crystal Length = 30. mm                            *************** Loss Parameters ***************
Pumped Area = 8.8 mm^2
Laser Mode Area = 4.5 mm^2                              Roundtrip Dissipative Loss = 1.2 %
Field Overlap Beta Factor = 8.788                       Diffraction Loss at Gain Aperture = 524.3 m^2
Pump Source = Pulsed Diode                              Resonant Absorption - to - Dissipative Loss Ratio = 0
                                                        Roundtrip Dissipative Loss Exponent = 0.012
*************** Pumping Parameters ***************     Gain Aperture Diffraction Loss Exponent = 0.605
                                                        Output Coupler Loss Exponent = 0.693
Pulsed Diode Peak Power = 1.3 kW                        Total Loss Exponent = 0.71
Pump Pulsewidth = 235.2 us                              Output Coupler Reflectivity = 50. %
Pulsed Diode Pulse Energy = 278.7 mJ
Pulse Repetition Frequency = 50. Hz                     *************** Gain Parameters ***************

*************** Pumping Efficiency Breakdown ***************    ---------- Long-Pulse Operation ----------

Quantum Efficiency = 89.5 %                             Roundtrip LP Small-Signal Gain Coefficient = 5.350
Quantum Defect Efficiency = 75.9 %                      Roundtrip LP Gain-to-Loss Ratio = 310.57
Optical Transfer Efficiency = 98. %                     LP Inversion Ratio = 7.54
Absorption Efficiency = 99.9 %                          Build-up Time = 35. us
Field Distribution Overlap Efficiency = 99.5 %          Spike Decay Time = 61.6 us
Effective Area Overlap Efficiency = 51.3 %              Relaxation Oscillation Frequency = 4.3 MHz
Overall Pumping Efficiency = 31.2 %                     ---------- Q-Switched Operation ----------

*************** Available Power and Energy ***************     Roundtrip QS Small-Signal Gain Coefficient = 3.367
                                                        Roundtrip QS Gain-to-Loss Ratio = 136.13
Available Pump Power = 374.5 W                          Initial Inversion Ratio = 4.72
Available Pump Energy = 87. mJ                          Final Inversion Ratio = 0.04
```

Fig. 12

```
**************** Average Output Power   ****************
------------------- LP Operation ------------------
   LP Output Power = 4. W
   Optimized LP Output Power = 4.7 W
------------------- Current QS Operation ------------------
   Maximum Average Output Power = 2.8 W

**************** Peak Power per Pulse   ****************
------------------- Current QS Operation ------------------
   Maximum Peak Power of Output Pulse = 9.5 MW
   Maximum Peak 2-Way Power at OC Mirror = 28.4 MW
   Maximum Peak 2-Way Power at HR Mirror = 26.8 MW

**************** Peak Intensity per Pulse   ****************
------------------- Current QS Operation ------------------
   Maximum Peak Intensity of Output Pulse = 209. MW/cm^2
   Maximum Peak 2-Way Intensity at OC Mirror = 627. MW/cm^2
   Maximum Peak 2-Way Intensity at HR Mirror = 591.2 MW/cm^2

**************** Output Pulse-Width   ****************
------------------- Current QS Operation ------------------
   Output Pulse-Width = 4.7 ns
```

Fig. 14

| Parameter | Threshold | Desired |
|---|---|---|
| Configuration #1 (standard designator) | | |
| Weight, w/ FOT + batteries | ≤4.0 lb | <2.0 lb |
| Volume, w/ housing | ≤70 in³ | <35 in³ |
| Energy, 1.06 µm | ≥50 mJ over temperature | >50 mJ over temperature |
| Divergence, 1.06 µm | ≤500 µrad, 90% points | <400 µrad, 90% points |
| ON time, any PRF | 30 sec ON, 30 sec OFF | 30 sec ON, 30 sec OFF |
| PRF / PIM codes | NATO-standard | All |
| Power, >50 designations | Li-AA batteries included | Li-AA batteries included |
| Maturity | TRL 4 | TRL 6 or higher |
| Configuration #2 (ultra-compact marker) | | |
| Weight, w/ FOT, no batteries | ≤1.0 lb | <0.5 lb |
| Volume, w/ sealed cavity | ≤15 in³ | <8 in³ |
| Energy, 1.06 µm | ≥25 mJ over temperature | >25 mJ over temperature |
| Energy, 1.5 µm | (Desired) | >5 mJ over temperature |
| Divergence, 1.06 µm | ≤800 µrad, 90% points | <500 µrad, 90% points |
| Divergence, 1.5 µm | (Desired) | <1500 µrad, 90% points |
| ON time, any PRF | 30 sec ON, 30 sec OFF | 120 sec ON, 30 sec OFF |
| PRF / PIM codes | NATO-standard | All |
| Power, >30 markings | ≤5 W-hr | <5 W-hr |
| Maturity | TRL 4 | TRL 6 or higher |

Fig. 17

POLARIZATION SCRAPING METHOD AND SYSTEM FOR UNIDIRECTIONAL ROTATIONAL MODE SELECTION WITHIN A LASER CAVITY

CROSS-REFERENCE TO RELATED APPLICATIONS

This application is a continuation under 35 U.S.C. 120 of U.S. application Ser. No. 13/304,305, filed Nov. 23, 2011, and entitled "ATHERMAL LASER GAIN MODULE" which claims priority to U.S. Provisional Application No. 61/417,257, filed Nov. 25, 2010, and entitled "COMPACT LASER" by Murray et al., each of which is hereby incorporated by reference in its entirety for all purposes.

FIELD OF THE TECHNOLOGY

Embodiments of this disclosure relate to lasers with compact form factors and high-power output and methods of manufacturing the same.

SUMMARY OF THE DESCRIPTION

A compact laser in accordance with an exemplary embodiment in the present disclosure includes a compact resonator structure using a non-planar resonator geometry of bulk components. The laser further includes a laser gain medium and a pump source integrated within an optical path of the resonator. Some embodiments contain modifications to the resonator structure for integration of the laser gain medium, for controlling the output from the laser, and/or for controlling the physical and operational parameters of the laser. Some embodiments contain modifications to the laser gain medium or other bulk components of the resonator to integrate these bulk components within the resonator structure.

Other embodiments and features of the present disclosure will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

FIGS. 6-10 show manufacturing and performance specifications of an exemplary embodiment of the assembly of the gain medium and the pump chamber.

FIGS. 11-16 show manufacturing and performance specifications of an exemplary embodiment of the resonator using an assembly of the gain medium and the pump chamber.

FIG. 17 shows specifications that may be met and/or exceeded with embodiments of a compact laser as described further herein.

DETAILED DESCRIPTION

The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one. Reference in this specification to "one embodiment" or "an embodiment" or the like means that a particular feature, structure, or characteristic described in connection with the embodiment is included in at least one embodiment of the disclosure. The appearances of the phrase "in one embodiment" or the like in various places in the specification are not necessarily all referring to the same embodiment, nor are separate or alternative embodiments mutually exclusive of other embodiments. Moreover, various features are described that may be exhibited by some embodiments and not by others.

Configurations of a compact laser are provided in some embodiments described herein to achieve high-intensity output pulses. In some embodiments, as described further herein, the configuration of the bulk resonator provides for significantly reduced size requirements and significantly increased thermo-mechanical hardiness while providing laser output meeting industry and military specifications, such as for pulsed output specifications.

Figure 1:
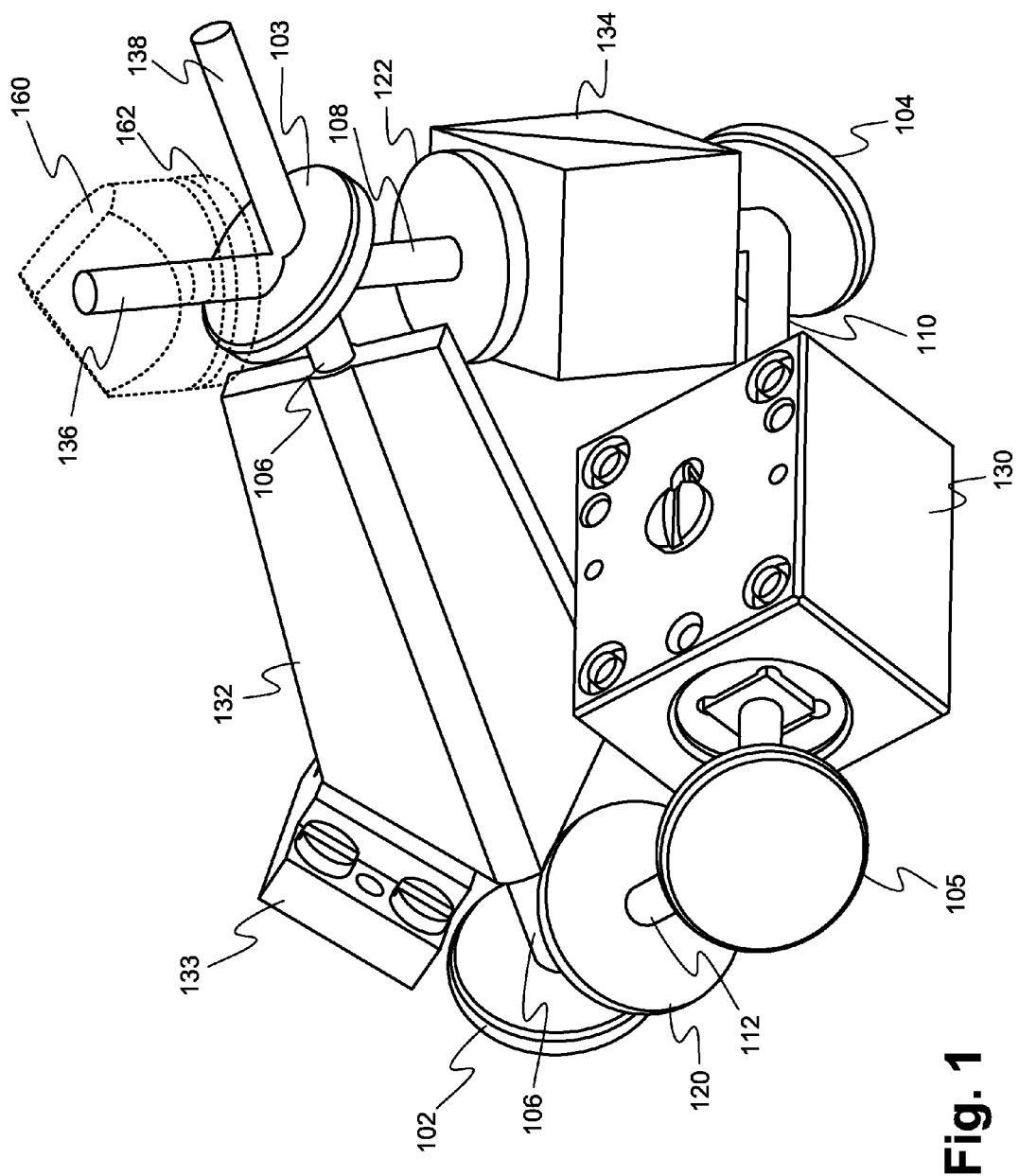
FIG. 1 shows an exemplary embodiment of a laser resonator configuration including a laser gain medium and pump light chamber configured within the resonator.

FIG. 1 shows an exemplary embodiment of a laser resonator configuration including a laser gain medium and pump light chamber configured within the resonator. Shown is a non-planar ring resonator 100 configured to include four mirrors 102-105, arranged in a non-planar configuration allowing light to propagate completely around the resonator. The four mirrors 102-105 define four "legs" of the optical path around the resonator. Specifically, the first mirror 102 reflects light on a leg 106 of the optical path that includes a section travelling through gain module 132. The first mirror 102 reflects light between the leg 112 and the leg 106 of the optical path which is incident on a second mirror 103. The second mirror 103 reflects light between leg 106 and leg 108 of the optical path. The third mirror 104 reflects light between leg 108 and leg 110 of the optical path. The fourth mirror 105 reflects light between leg 110 and leg 112 of the optical path. In one embodiment, the second mirror is an output coupler that is partially reflective, leading to transmitted light both along transmission path 136, which is a continuation of leg 108 of the optical path within the resonator 100, and along transmission path 138 continuation of leg 106 of the optical path within the resonator.

The non-planar configuration of the resonator 100 provides for image rotation on each round trip of the light around the resonator. In one embodiment, legs 106 and 108 of the optical path lie in a first plane while legs 110 and 112 lie in a second plane and the image of the light in the optical path of the resonator may be rotated 90 degrees for each trip that the light travels around the resonator 100. In another embodiment, the angle of image rotation per trip is an angle other than 90 degrees. For example, an angle may be 30-60 degrees resulting in less image rotation per roundtrip around the resonator 100, and a completion of a full image rotation after 6-12 roundtrips around the resonator 100. In another embodiment, the angle of image rotation is not a factor of a full rotation (e.g., 360 degrees, 2*pi radians).

The non-planar ring resonator 100 provides for image rotation, as described further herein, which provides for polarization rotation with the same angle as the image rotation. The polarization rotation commensurate with the image rotation of the resonator may be counteracted by a wave plate 122 (e.g., half wave plate for an angle of 90 degrees) included in leg 108 of the optical path. Other parameters of the wave plate 122 may be adjusted to provide the correct polarization rotation (e.g., equal to angle of image rotation) to preserve the polarization state of the laser field in the light after each roundtrip through the resonator 100.

The optical path within the resonator 100 may have multiple resonant modes, including counter-propagating modes whereby light traverses the resonator in opposing directions. For example, one resonant mode of light in the resonator 100 may travel along the optical path of the resonator from leg 106, to leg 108, to leg 110, and then to leg 112 (a "clockwise" direction). As another example, another resonant mode of light in the resonator may travel along the optical path in an opposite direction, travelling the legs of the path in reverse order (a "counter-clockwise" direction).

The resonator 100 includes a laser gain module 132, as described further herein. For example, a laser gain module 132 may be pumped from a pump light source 133, also as described further herein. In one embodiment, a laser gain medium is configured to be pumped from an end of the gain medium (e.g., along the optical axis of the gain medium). In another embodiment, the laser gain module 132 is configured to couple with a pump light source 133 on the side of the laser gain module 132. Details of embodiments of the laser gain module 132 are described further herein.

The resonator 100 includes a Q-switch 130. For example, the Q-switch 130 may be an electro-optical Q-switch. As another example, the Q-switch 130 may be configured as a saturable absorber. The Q-switch 130 may be used to pulse the output light of the resonator 100, such as light on optical path 136 and/or on optical path 138. Functions of the embodiments of the resonator 100 that include the Q-switch 130 within the resonator's optical path are described further herein. In some embodiments, also described further herein, the resonator 100 may be operated in continuous wave operation.

The resonator 100 includes a polarizer 134 and associated wave plate 122 where the wave plate corrects for polarization rotation of the light (e.g., occurring commensurate with the image rotation) before the clockwise travelling light on leg 108 of optical path reaches the polarizer. The polarizer 134 selected may include a high extinction ratio (e.g., 100:1). The polarizer 134 may be selected with a high damage threshold (e.g., >500 MW/cm^2), such as for pulsed operation of the resonator. Furthermore, the polarizer 134 may be selected to operate over a large temperature range.

The operation of the counter-propagating modes available inside the resonator 100 may be influenced by additional elements outside the resonator. In one embodiment, the resonator 100 is coupled with a reflective element 160 such as a prism (e.g., a roof prism, a corner cube) that is configured to reflect light on the optical path 136. In another embodiment, the resonator is coupled with a mirror or other reflective (e.g., partially reflective) element on the optical path 136. In another embodiment, there is no reflective element (e.g., partially reflective element) that is coupled with either output optical path 136 or output optical path 138 that exits the resonator 100.

In embodiments with a reflective element 160 that produce polarization and/or image rotation, corrective elements may be employed (e.g., outside the resonator 100) in order to modify the reflected light returning along optical path 134 from the reflective element back into the resonator. For example, a wave plate 162 (e.g., ~⅗ wave plate) may be used to correct for polarization rotation caused by the light reflecting multiple times within the corner cube 160 before the light re-enters the resonator 100.

In embodiments with a reflective element, such as corner cube 160 coupled to an output optical path 136, light exiting the resonator from a first resonant mode direction of the resonator is reflected back along the optical path into the resonator in order to couple with an opposing resonating mode direction of the resonator. The feedback operates to select a dominant direction of resonant mode(s) in the resonator through taking some or all of the light exiting the resonator from one resonant mode direction and coupling the light with the other resonant mode direction, thereby depleting one resonant mode direction and supporting the growth of the other resonant mode direction.

In one embodiment, all light of one resonant mode direction exiting the second mirror 103 along optical path 136 is fed back into an opposing direction (e.g., along optical path 136) via complete reflection. For example, a corner cube or roof prism (e.g., a three-surface corner cube) may be used to reflect light back into the resonator. As another example, a mirror may be used to reflect light back into the resonator. In another embodiment, only a portion of the light in one resonant mode direction exiting the second mirror 103 along optical path 136 is fed back into an opposing direction. For example, a partially reflective element or an element with variable reflectivity may be used outside the resonator to feedback portions of the light into the opposing direction.

Establishing the dominant direction of resonant mode(s) through this feedback occurs while the resonant mode(s) in the resonator are being populated. For example, the resonator may establish resonant mode(s) while the resonator begins lasing. As another example, the dominant direction of resonant mode(s) is determined while a Q-switch is turning on (e.g., while the Q-switch is becoming active, while the Q-switch is decreasing losses in the resonator). As described further herein, the Q-switch transition may take a period of time and, in some embodiments, may be modulated.

In another embodiment, an isolator may be included within the optical path of the resonator. For example, a Faraday isolator may be inserted within the optical path. If an isolator is used within the optical path of the resonator 100 to limit or eliminate a direction of resonant mode(s) within the resonator, a reflective element 160 and associated corrective optical elements (e.g., wave plate 162) may be unnecessary outside the resonator for selecting a particular direction of light travel within the oscillator. Such reflective elements and corrective optical elements may be removed, if not used for another purpose.

In one embodiment, the resonator 100 is configured to be operated in continuous wave (CW) output mode. For example, the resonator 100 may be configured without a Q-switch 130 within the resonator. Configurations of the resonator 100 without a Q-switch may use lower damage threshold components, but require elements that provide low loss (e.g., a Brewster plate may be substituted for a cube polarizer) and the output coupling mirror 103 must be chosen carefully.

In another embodiment, the resonator 100 includes a Q-switch 130 within the optical path of the resonator (e.g., on a leg 110 of the optical path). The Q-switch 130 may be configured to modulate the Q-factor of the resonator 100 through selective retardation of the light in the optical path. A Q-switch 130 may be used to pulse the output of the resonator 100 by holding the loss of the resonator above the gain, and then, based on a triggering event (e.g., electrical signal), rapidly reducing the loss of the resonator (e.g., to zero), thereby allowing the laser to rapidly build up a pulse and deplete the gain.

In embodiments with a single or dominant direction of resonant mode(s), the resonator 100 may require modified operational parameters of some elements in order to compensate for the reduced or eliminated presence of the counter-propagating mode(s). For example, the gain of resonator 100 (e.g., roundtrip gain experienced by a mode) is reduced by limiting the modes populating the resonator. As another example, the effectiveness of a Q-switch 130 within the resonator 100 is reduced by limiting the modes populating the resonator. In embodiments using a Q-switch 130 to control pulsing of laser light that is output from the resonator 100, the operational parameters of the Q-switch, light/pumping source 133, and/or laser gain module 132 (e.g., containing a laser gain medium) within the resonator may be significantly affected by limiting modes of the resonator. For example, the Q-switch 130 may have to be modulated and/or driven over a larger dynamic range. As another example, the light source (e.g., pump light source 133) and/or the gain module 132 within the resonator 100 may have to be driven, modulated, tailored, or manufactured to control or modify the gain within the resonator.

A single resonant mode direction limits the effectiveness of a Q-switch 130 to create losses within the resonator 100. In embodiments of the resonator 100 with a Q-switch 130 and configured to develop a dominant (e.g., exclusive) direction of resonant mode(s), the Q-switch may require significantly more dynamic range to effectively pulse the laser output (e.g., along optical path 138) of the resonator with the same pulse output specifications due to the single direction of resonant mode(s) populating the resonator. For example, a Q-switch 130 may require a dynamic range of ¼ wave for configurations where two directions of resonant modes are present in the resonator and, in an otherwise similar configuration of the resonator, the Q-switch may require twice the amount of dynamic range (e.g., ⁄1;2 wave) where only one direction of resonant mode is present. As another example, the Q-switch 130 may require somewhere between 100% and 200% of the dynamic range due to the existence of only a single direction of resonant mode in the resonator 100.

In a Q-switch 130 requiring electrical signals proportional to the retardation provided, such as an electro-optical Q-switch, the increased dynamic range requirements for the Q-switch may require significant and potentially detrimental increases in the electrical dynamic range. For example, it is possible that, for an electro-optical Q-switch 130, an electric potential of several thousand volts (e.g., 6 kV) is required where counter-propagating modes are present in the resonator, and a doubling of that electric field (e.g., to 12 kV) would cause electrical breakdown conditions to occur in the Q-switch or other components handling that electric potential in a compact resonator.

In embodiments of the resonator 100 that use short optical paths, such as where the resonator is designed for construction into a compact laser, the increased requirements for electric potentials can become problematic where those electric potentials are applied over the very small distances associated with the compact configuration. For example, the length of a leg 106, 108, 110, or 112 of the optical path may be 28.28 (or 40/sqrt(2)) to 40 millimeters and a small electro-optical Q-switch 130 positioned in one of the legs may require the electric potential to be applied across less than 10 mm, or potentially less than 1 mm, leading to an extremely high electric field that may cause breakdown, arcing or other problems inside the resonator 100 configuration. Compensating for an extremely high electric field (e.g., approaching arcing) within the resonator 100 can cause detrimental impact on other characteristics of the resonator such as, for example, an increase in the size, weight or power requirements of the resonator. For example, a vacuum chamber or other pressurized chamber could be used to prevent arcing, but the added complexity, weight, power requirements and attendant detriment to portability and/or mechanical robustness may spoil significant benefits of the resonator 100.

A single direction of resonant mode(s) limits the effective gain of the resonator 100 via limiting the light interacting with the gain medium (e.g., on each round trip) within the resonator. The gain reduction based on limiting the direction of resonant mode(s) within the resonator 100 affects the pulse shaping of the output via decreasing the rate at which the energy stored in the gain medium of the gain module 132 is transferred into the resonant mode(s). As described further herein, the intensity of the output light in pulsed operation of the resonator 100 may strongly depend on the gain of the resonator, which may further depend on the resonant mode(s) allowed in the resonator. Via limiting the resonant modes of the resonator 100, the configurations described herein may allow particular pulse-shaping capabilities.

Figure 2:
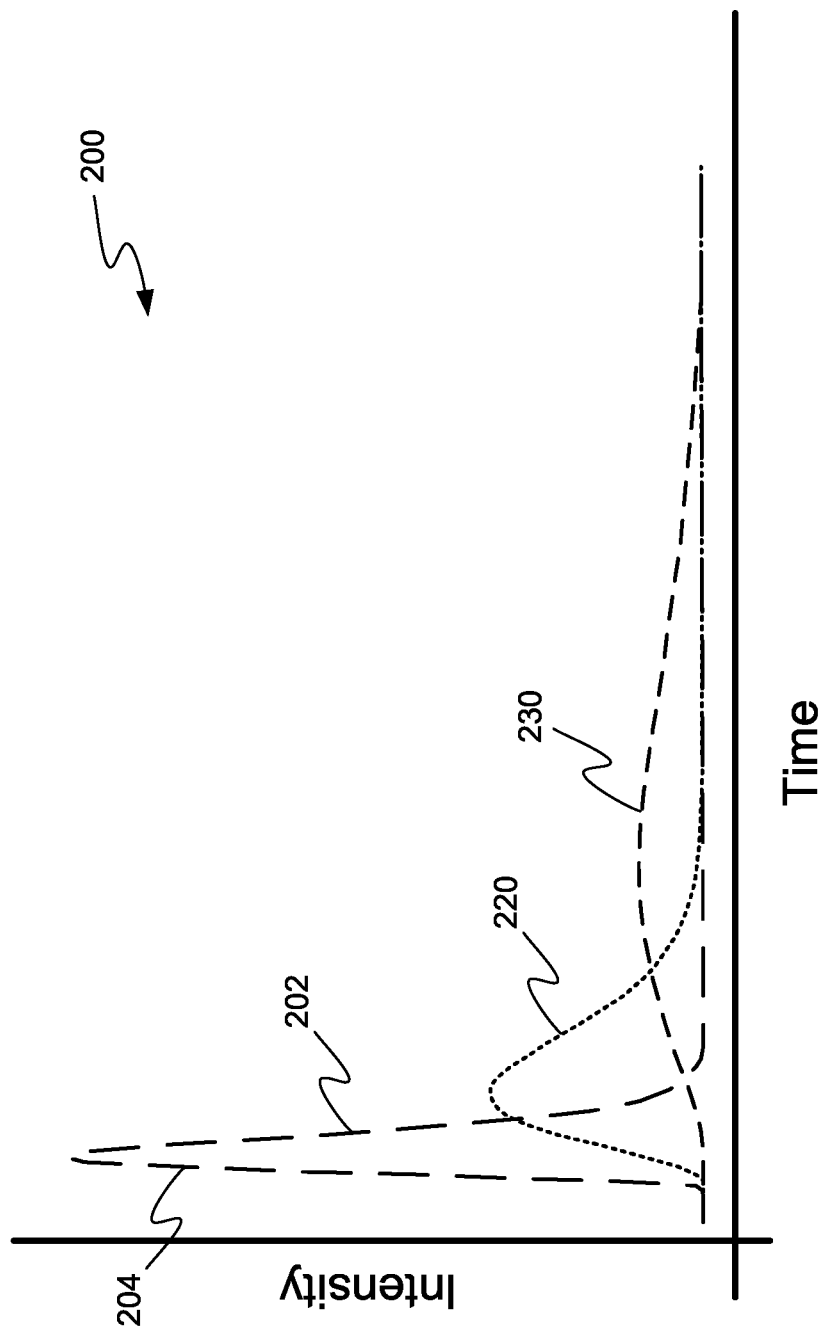
FIG. 2 is a graph of the intensity of a pulsed output of the resonator showing different pulsewidths of output from the resonator.

FIG. 2 is a graph of the intensity 200 of a pulsed output of the resonator showing different pulsewidths of output 210, 220, 230 from the resonator. The gain of the resonator affects both the rise and decay of the intensity of the output pulse, as described by the equation noted in Equation 1.

$$i(t) \propto \frac{(t/b)^n}{n!b} e^{-t/b(t)} \qquad \text{Equation 1}$$

Equation 1 is a normalized equation relating the intensity of the output pulse 210 of the resonator (i), as a function of time (t), as it is governed by the laser gain (n), and the cavity lifetime (b(t)), which, in turn, is governed by the output coupling loss of the laser resonator. The cavity lifetime of the resonator is further related to the natural logarithm of the reflectivity of the output mirror multiplied by the perimeter length of the cavity divided by the speed of light in the resonator. Thus, the cavity lifetime and pulse shape of the output pulse may be controlled in the resonator, at least in part, by the selection of an output coupler or the tuning of a voltage-controlled output coupler, as described further herein.

The rise in intensity, i(t), of the output pulse 210, 220, or 230 is dominated by a power-law in gain and the decay of the intensity is dominated by a negative exponential of loss. As described further herein, the pulse shape is affected by the gain of the resonator, which in turn is controlled, in part, by the selection within the resonator of a dominant direction of the resonant mode(s). The rise in intensity of the output pulses 210, 220, and 230 may also be modulated by the operation of the Q-switch within the resonator. In one embodiment, the Q-switch may control the losses within the resonator in order to shape the intensity of the pulse output over time. For example, the Q-switch may be switched such that onset of lasing within the resonator is restrained. As another example, the Q-switch may be switched such that the depletion of pumped states in the gain medium is limited. Based on the other attributes of elements in the resonator, the driving signal to the Q-switch may be tailored to produce the desired output pulse 210, 220, or 230 based on modeling of the resonator and/or based on test signals driving the Q-switch in actual operation of the resonator.

The pulse shaping of the output pulses 210, 220, or 230 of the resonator may be controlled through modulating the reflectivity of the output coupling element of the resonator. For example, an output coupling device may be used with variable reflectivity, such as a voltage-controlled output coupler, thereby allowing modification of the cavity lifetime of the resonator and commensurate pulse shaping of the output pulses 210, 220, and 230.

In the embodiments of the resonator described herein with a dominant single direction of resonant mode(s), the suppression of the gain of the resonator can stretch the pulse output from the resonator. In one embodiment, the stretching of the pulse over time occurs with a commensurate trade-off in peak intensity of the pulse. For example, the energy stored within pumped states within the gain medium may be depleted without additional pumping or repopulation of energy levels. In another embodiment, a repopulation of the Stark levels occurs, for example, without additional energy level transitions due to additional pumping.

Figure 3:
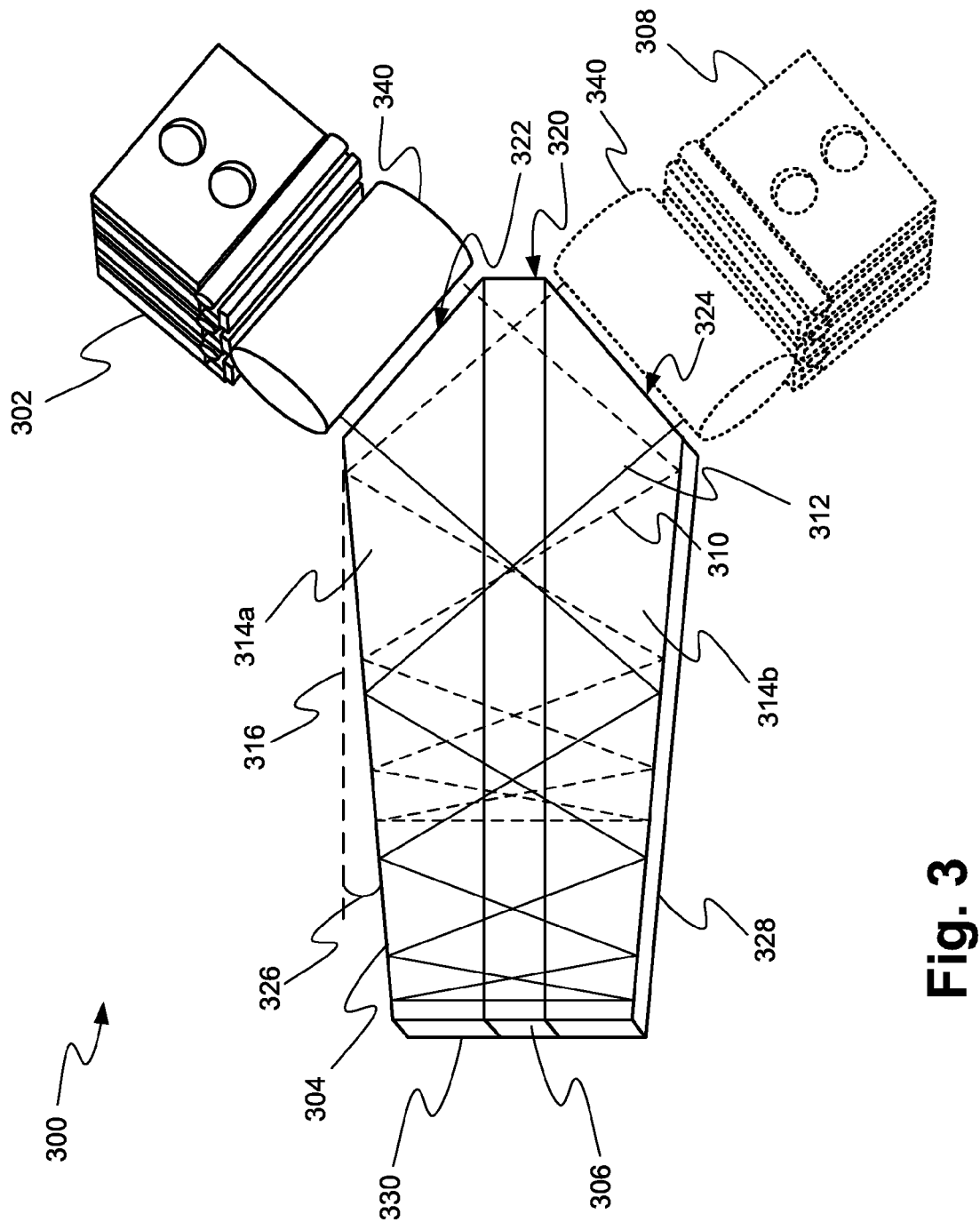
FIG. 3 shows a diagram of an exemplary embodiment of a gain medium and pump light guide assembly for use, for example, within a resonator.

FIG. 3 shows a diagram of an exemplary embodiment of a gain medium and pump light guide assembly 300 for use, for example, within a resonator. The configuration of the assembly 300 includes a pump light chamber 314*a-b* in an irregular hexagon-shaped configuration with a gain medium 306 interposed between edges of the pump light chamber. The pump light chamber 314*a-b* is adapted to guide the pump light 310 and 312 through multiple internal reflections, crossing the gain medium multiple times in the process. In one embodiment, the assembly is coupled with a pump light source 302 (e.g., pump diode or array of pump diodes) on one side 322. In another embodiment, the assembly is coupled to a second pump light source 308 on another side 324 of the assembly. The pump light sources 302 and/or 308 may be coupled to the pump light chamber 314*a-b* through an optional lens 340.

The assembly 300 includes a gain medium portion 306 flanked by two pump chamber portions 314*a-b*. The assembly 300 is constructed as an irregular hexagon, with two sides 320, 330 each adapted to include an exit path of the gain medium 306. For example, one side 320 may consist of the gain medium portion 306, which may include one or more exit paths for light (e.g., on an optical path of a leg of the resonator described further herein). As another example, one side 330 may be formed by both the gain medium 306 and a section of the pump chamber portions 314*a-b*. As another example, side 320 is formed by both the gain medium portion 306 and the pump chamber portion 314*a-b*.

In other embodiments, the pump light chamber may be configured in other shapes to enable multiple passes of pump light through a gain medium. For example, a pump light chamber may be configured with a parabola shape or a hyperbola shape.

In the irregular hexagon embodiment, the pump chamber portions 314*a-b* expand from side 320 along sides 322 and 324, which may be configured to couple with the pump light source (e.g., through optional lens 340). Sides 322 and 324 of the pump chamber again narrow back toward the gain medium along sides 326 and 328, as defined by an angle 316 off of parallel with the gain medium. Sides 326 and 328 of the pump chamber meet with side 330, which in one embodiment is parallel with side 320. The side 330 is comprised partially by the pump chambers 314*a-b* and partially by the gain medium (e.g., an exit path for laser light on an optical path of the resonator).

As shown by lines indicating optical paths of the pump light, the chamber 314*a-b* causes the pump light to cross the gain medium 306 in multiple places along the gain medium via multiple reflections through the assembly 300. Via passing the pump light multiple times through the gain medium 306, the assembly 300 may cause the gain medium to be strongly pumped by the pump light despite variations in the wavelength(s) of the pump light due to temperature variations. In addition, any variations across one or more of the pump light beams may become spatially averaged over the gain medium, allowing for uniform pumping of the gain medium.

The assembly 300 may be constructed of a single piece of YAG (e.g., monolithic YAG). For example, a single piece of YAG may be doped in one portion to absorb pump light 310 and produce stimulated emission as a gain medium 306 and may be doped in another portion or other regions 314*a-b* (e.g., for use as a pump chamber on either side of the gain medium) to produce no absorption of pump light. The pump light chamber portions 314*a-b* may be designed to produce internal reflections (e.g., due to indices of refraction, due to mirrors) of the pump light 310 and/or 312, allowing the irregular hexagon configuration of the pump light chamber to reflect the pump light many times while pumping different portions of the gain medium 306. In another embodiment, the assembly 300 is constructed from multiple elements bonded or otherwise coupled to allow pump light to cross between the elements. For example, the pump chamber elements 314*a-b* may each be constructed of monolithic doped YAG, and the gain medium element 306 may be constructed from monolithic YAG that is doped with different material(s).

The laser gain medium 306 is YAG that is doped to absorb pump light 310. For example, the gain medium 306 may be ceramic YAG doped with 1% neodymium (Nd). As another example, the gain medium may be YAG doped with 0.5%-0.8% Nd. As another example, the gain medium may be YAG doped with 0.8%-2% Nd.

The pump chamber 314*a-b* is doped not to absorb pump light 310 and may, in some embodiments, be doped to mitigate parasitic oscillations and/or amplified spontaneous emission, as described further herein. For example, the pump chamber 314*a-b* may be ceramic YAG doped with 5% Samarium (Sm). As another example, the pump chamber 314*a-b* may be YAG doped with 0.5%-5% Sm. Further design details are described further herein for constructing, manufacturing and doping portions of the assembly 300 (e.g., gain medium 306 and pump chambers 314*a-b*).

The pump chamber 314*a-b* may be doped to affect autonomous, parasitic, or otherwise irregular or spontaneous emissions of photons from the gain medium. As described further herein, the pump chambers may be doped with Sm to absorb spontaneously-emitted photons. The doping of with the Sm in the pump chamber 314*a-b* may be controlled to keep the index of refraction of the pump chamber 314*a-b* above the gain medium 306, thereby allowing spontaneously-emitted photons into the pump chamber, and preventing their return into the gain medium.

Figure 4:
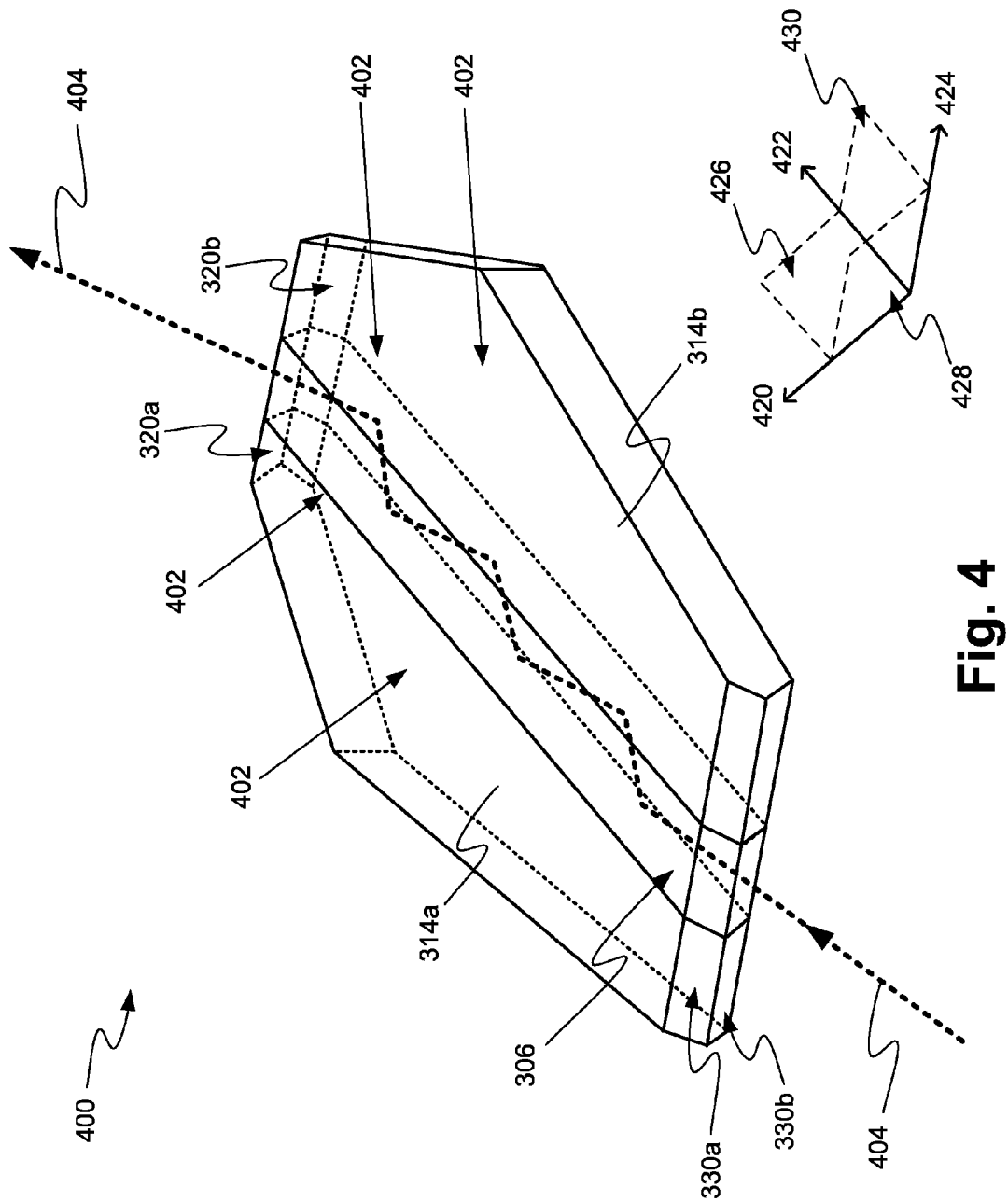
FIG. 4 shows a diagram of another exemplary embodiment of an assembly 400 of a gain medium and pump light chamber utilizing internal reflections along a zig-zag path in order to cancel thermally-induced optical aberrations due to pumping of the gain medium.

FIG. 4 shows a diagram of another exemplary embodiment of an assembly 400 of a gain medium 306 and pump light chamber 314*a-b* utilizing internal reflections along a zig-zag path in order to cancel thermally-induced optical aberrations due to pumping of the gain medium. The assembly 400 includes top and bottom surfaces parallel to horizontal plane

430. Pump light chamber 314*a-b* may be pumped by pump light 402 as described further herein.

In one embodiment, as described further herein, the input and output ends of the gain medium 306 each comprise a single facet connecting the top and bottom surfaces of the assembly 400. For example, the single facet may be parallel to a vertical plane 426 and perpendicular to horizontal plane 430. As another example, the single facet may be at an acute or obtuse angle to the top and bottom surfaces of the assembly 400 and to the horizontal plane 430. A single facet may be angled in a manner that minimizes closed path internal reflections that may promote parasitic oscillation.

In one embodiment, the ends of the gain medium are defined on either end by multiple facets 330*a-b* and 320*a-b*. For example, the gain medium 306 and pump chamber 314*a-b* are configured to have an irregular hexagonal cross-section when viewed on edge along axis 424. An end surface of the assembly 400 includes facets 330*a-b* at an angle to vertical plan 428. The facets 330*a-b* may be defined by angles with vertical plane 428 (i.e., angles of rotation within plane 426), and the angles may be equal angles with the plane 428. Facets 320*a-b* may be similarly defined by angles with plane 428. The facets 330*a-b* provide distinct entrance/exit optical path 404 into/from the gain medium 306 allowing light of a resonator mode to follow a zig-zag path in a vertical plane 426 through the gain medium.

Figure 5:
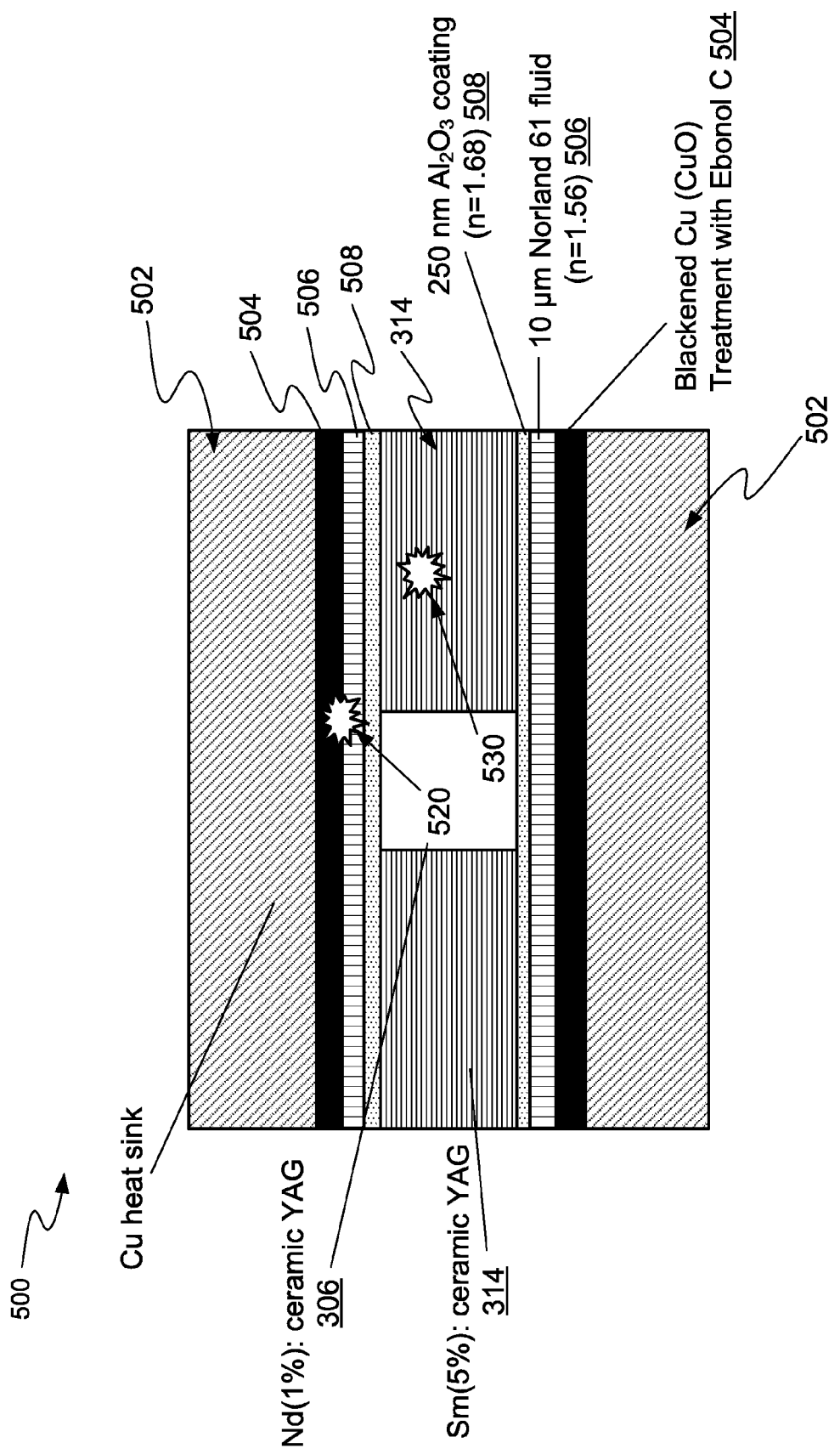
FIG. 5 shows a diagram of a cross section of an exemplary embodiment of a gain medium and pump chamber in an assembly.

FIG. 5 shows a diagram of a cross section of an exemplary embodiment of a gain medium 306 and pump chamber 314 in an assembly 500. Amplified spontaneous emission (ASE), parasitic emissions of photons, and autonomous emissions of photons may occur in the gain medium 306, particularly where the pumping of the gain medium reaches a saturated or nearly-saturated state. For example, the gain medium 306 may saturate after a period of time of being exposed to pump light. Autonomous emissions may occur in random directions and may trigger ASEs as the autonomously-emitted photon travels through the gain medium. The assembly 500 may limit propagation of unwanted spontaneously-emitted photons within the assembly (e.g., autonomously-emitted photons, related ASE photons).

In one embodiment, layers of the assembly 500 contribute to absorbing or dissipating spontaneously-emitted photons. For example, in configurations of the assembly 500 with a relatively flat cross section and/or with a gain medium that extends across an axis (e.g., vertical axis) of the material (e.g., a portion of the optically-doped YAG), layers of other materials may be connected with the material to absorb spontaneously-emitted photons emitted in directions that exit the gain medium out of a surface normal to that axis (e.g., a horizontal surface of the gain medium). As one example, layer 506 and layer 508 of the assembly 500 may be selected with respective indices of refraction to create total internal reflection of a wavelength of the resonant mode light (e.g., 1064 nm) within the gain medium 306 at an angle that is less than or equal to a zig-zag angle 410 of the gain medium. As described further herein, layer 508 may be constructed of 250 nm thick $Al_2O_3$ (n-1.68) and layer 506 may be constructed of 10 μm of optical epoxy, Noland 61 fluid (n-1.56). Via constructing the layers 506 and 508 as described further herein, unwanted spontaneously-emitted photons are routed out of the gain medium 306 if the unwanted spontaneously-emitted photons are produced in an angle greater than a zig-zag angle 410 allowed in the gain medium as shown by path 520. In the assembly 500, an absorbing layer 504 is adapted to absorb light at a wavelength of the spontaneously-emitted photons. For example, the absorbing layer 504 may be a blackened copper layer of a copper heat sink or heat-spreader, such as a copper-containing surface blackened with a treatment such as "Ebonol C" (U.S. Mil. Specification MIL-F-495E).

In another embodiment, the pump chamber 314 is doped so as to absorb spontaneously-emitted photons (e.g., 1064 nm), but not to absorb pump light (e.g., with peak intensity centered at 808 nm). For example, spontaneously-emitted photons may follow path 530 out of the zig-zag plane of the gain medium 306 and into the pump chamber 314. The doping of the pump chamber may comprise YAG doped with Sm, as described further herein, thereby absorbing the spontaneously-emitted photons (e.g., 1064 nm), but not the pump light.

Figure 6:
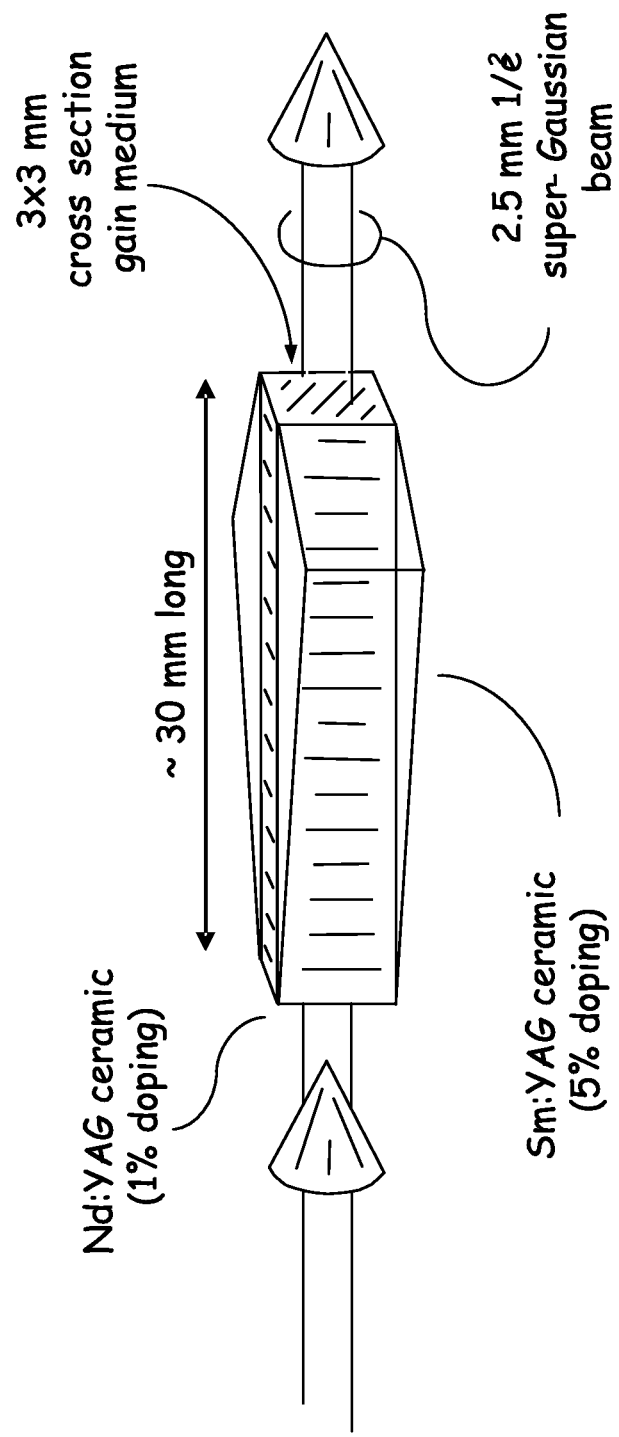
Figure 7:
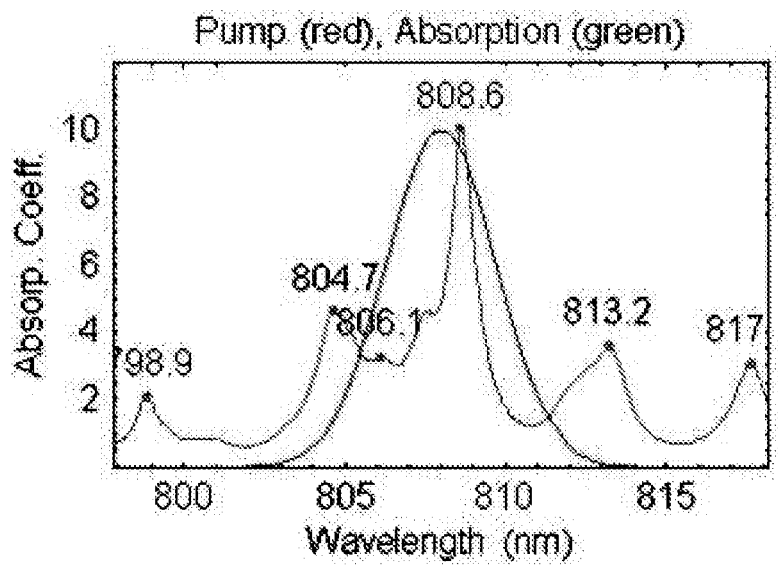
Figure 8:
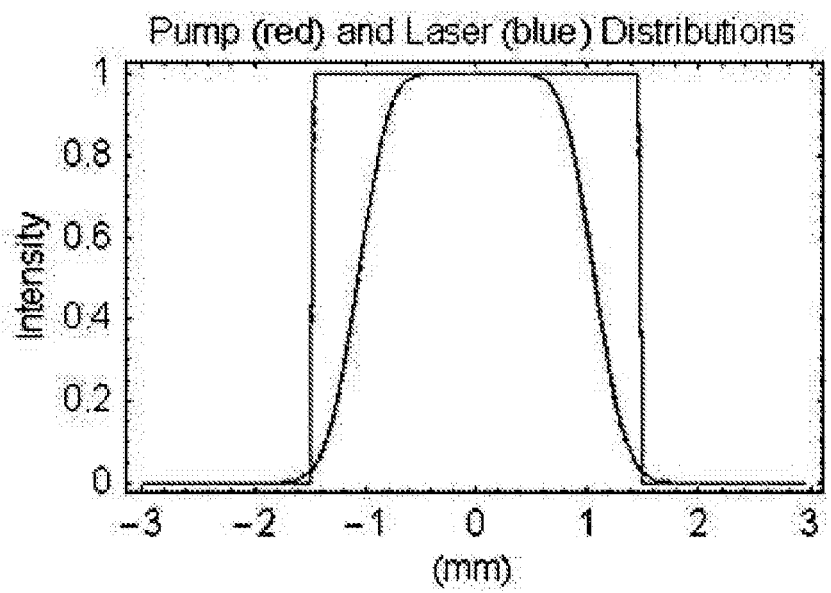
Figure 10:
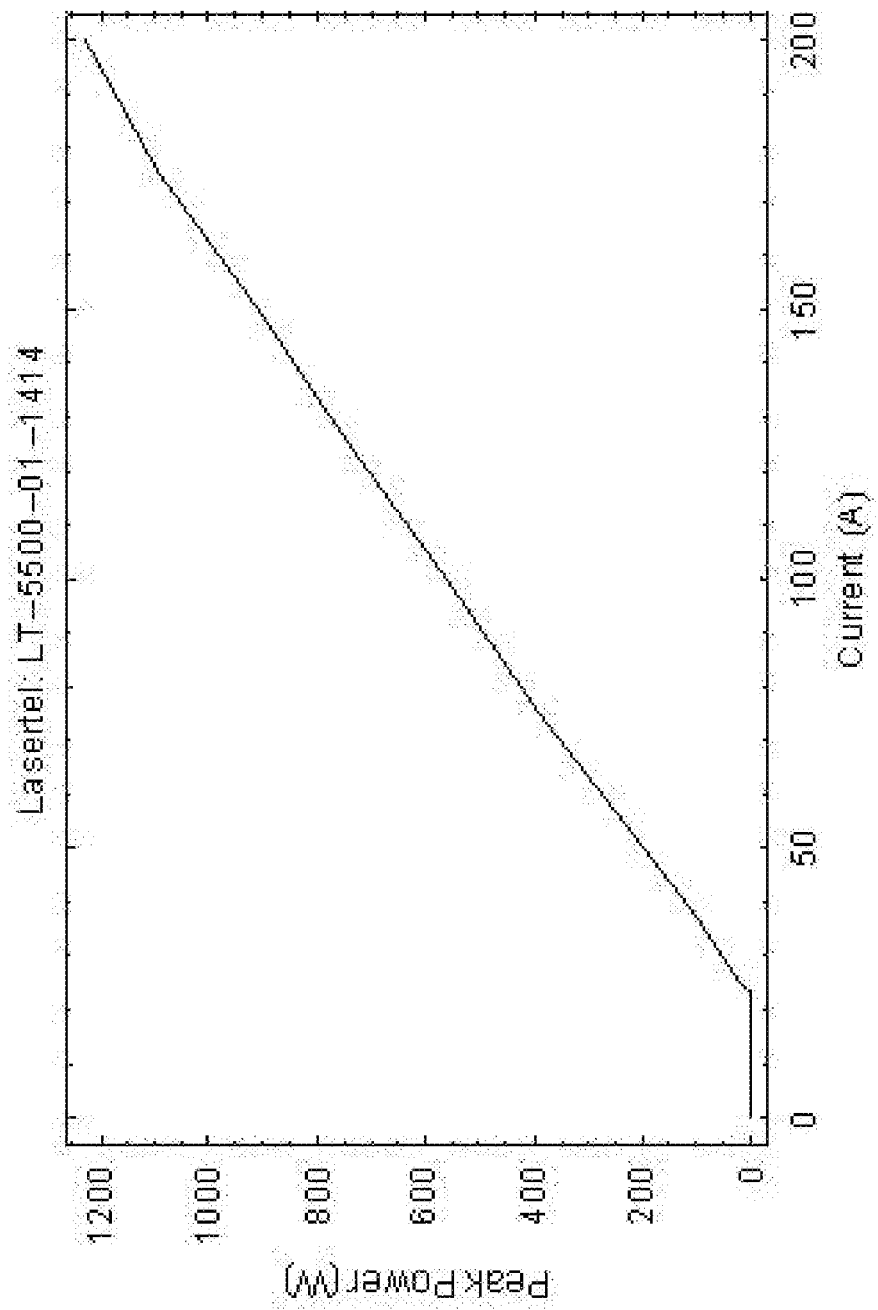

FIGS. 6-10 show manufacturing and performance specifications of an exemplary embodiment of the assembly of the gain medium 306 and the pump chamber 314*a-b*. Some embodiments of the gain medium and pump chamber may be specifically designed for operation within a resonator, as described further herein, whereas other embodiments may be designed for use in other systems. FIG. 6 shows configuration details of a gain medium and pump chamber according to one embodiment. FIG. 7 shows details of the overlap between the pump light wavelength 702 centered at 808 nm (not including temperature-induced variations) and absorption characteristics 704 of Nd:YAG, as described further herein. FIG. 8 shows details of the modeled distribution of normalized intensities of both the laser light 804 within the gain medium and the pumped energy 802 stored within the gain medium. FIG. 9 shows specifications of an exemplary diode pump light source (LaserTel: LT-5500-01-1414) with a specified thermal output wavelength drift of 0.3 nm/degree Celsius. FIG. 10 shows a relationship between the output of an exemplary diode pump light source (LaserTel: LT-5500-01-1414) and the drive current used. In one embodiment, the drive current is pulsed at 0-50 Hz with a 230 μs long pulse, which relates to the upper-state fluorescence lifetime of Nd:YAG.

FIG. 11-16 show manufacturing and performance specifications of an exemplary embodiment of the resonator using an assembly of the gain medium and the pump chamber. FIG. 11 shows design details of bulk components of a resonator 100, pump light source 133, and gain module 132 according to one embodiment.

Figure 13:
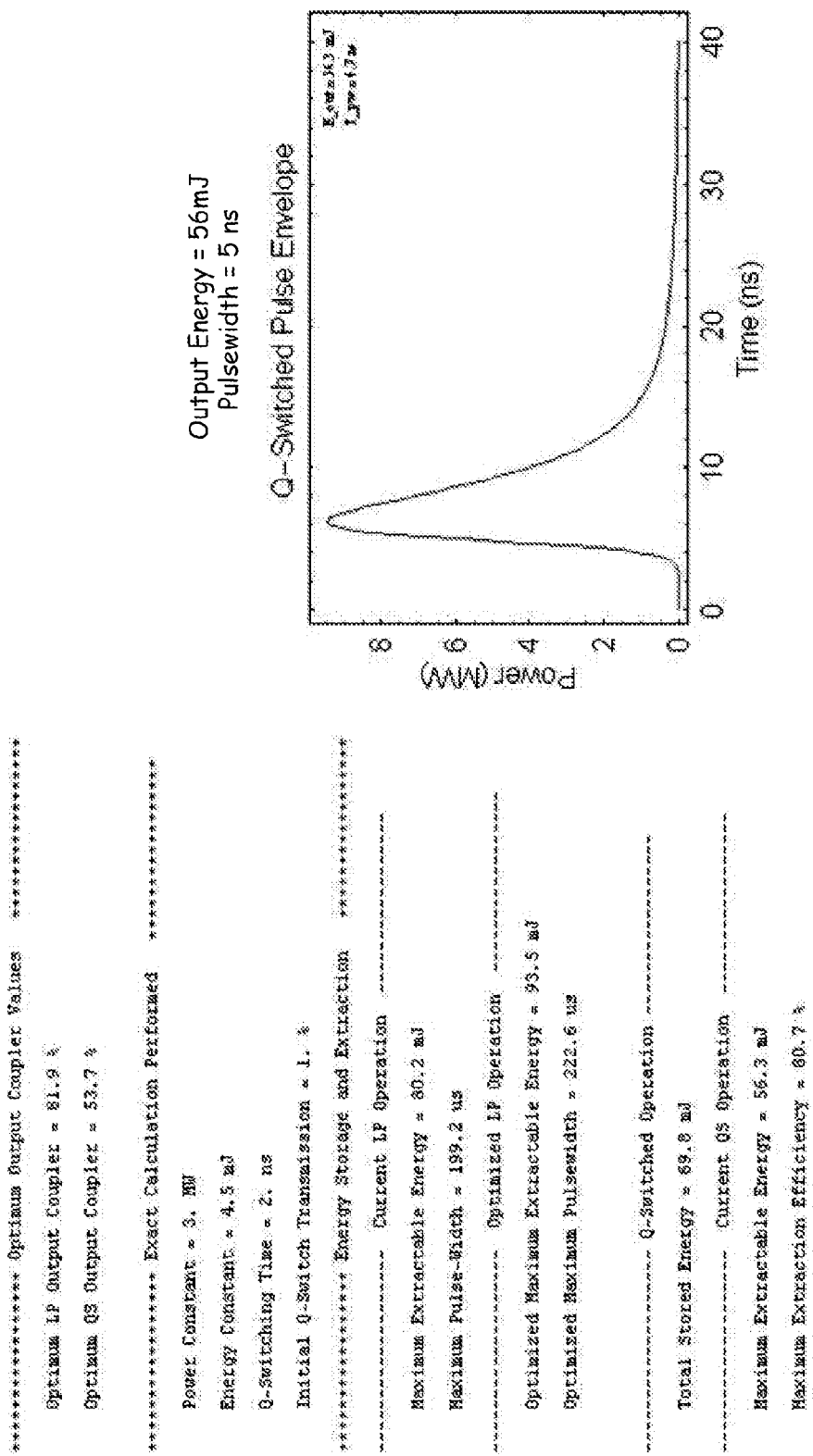

FIGS. 12-14 show output characteristics for the resonator built according to the present disclosure. Using the descriptions herein of the resonator structure and bulk components, embodiments of a compact laser may be constructed that both exhibits the output properties shown in FIGS. 12-14 and described further herein, and remains compact and lightweight. For example, a compact laser may be constructed, as described herein, weighing under 0.5 pounds and occupying less than 6 in^3. As another example, a compact laser may be constructed weighing under 0.5 pounds and occupying less than 10 in^3. As another example, a compact laser may be constructed weighing under 300 grams and occupying less than 6 in^3. As another example, a compact laser may be constructed within dimensional limits of 65 mm×50 mm×50 mm. Several of the embodiments of the compact laser described herein each are capable of meeting the specifications outlined in FIG. 17.

Figure 15:
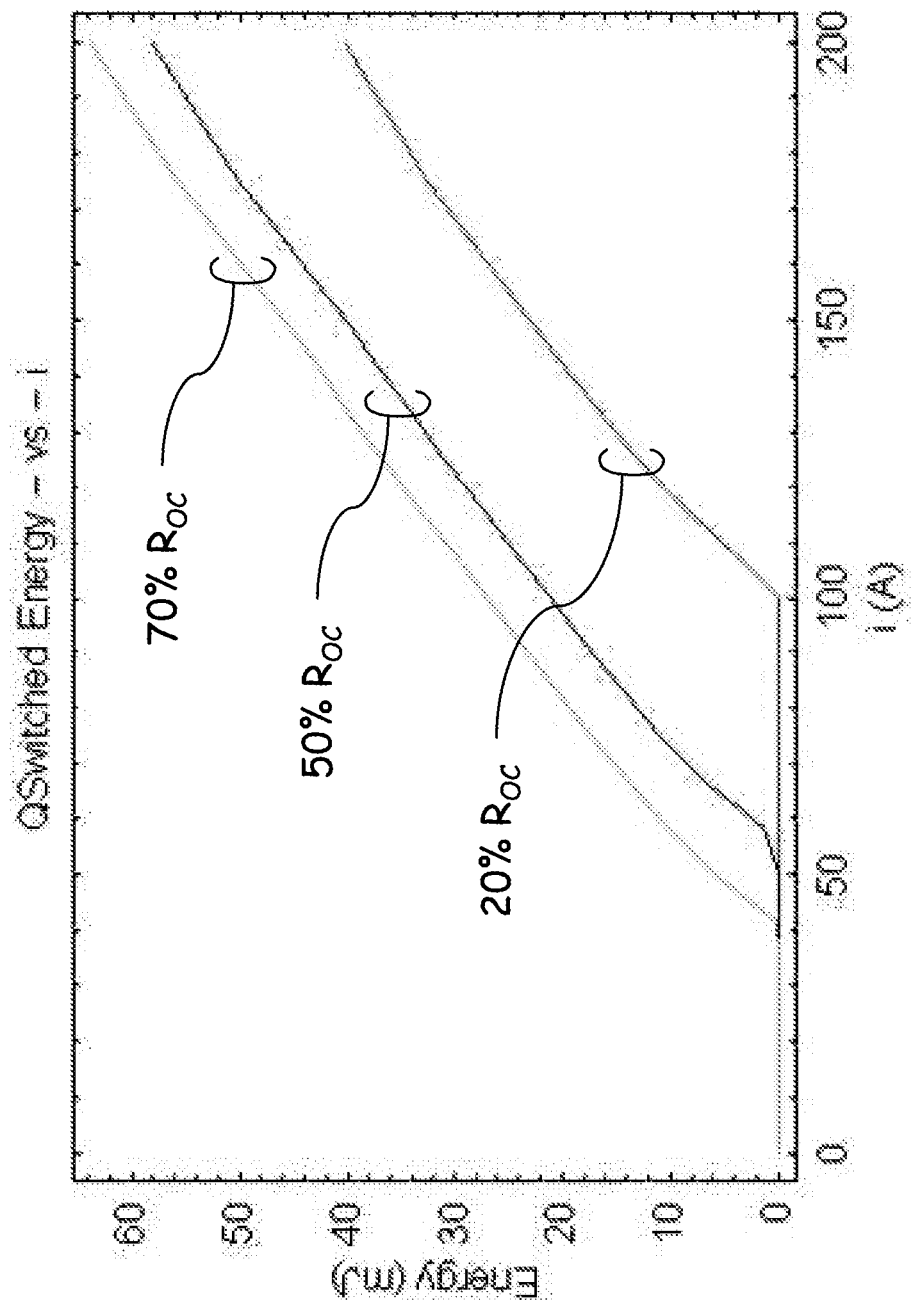
Figure 16:
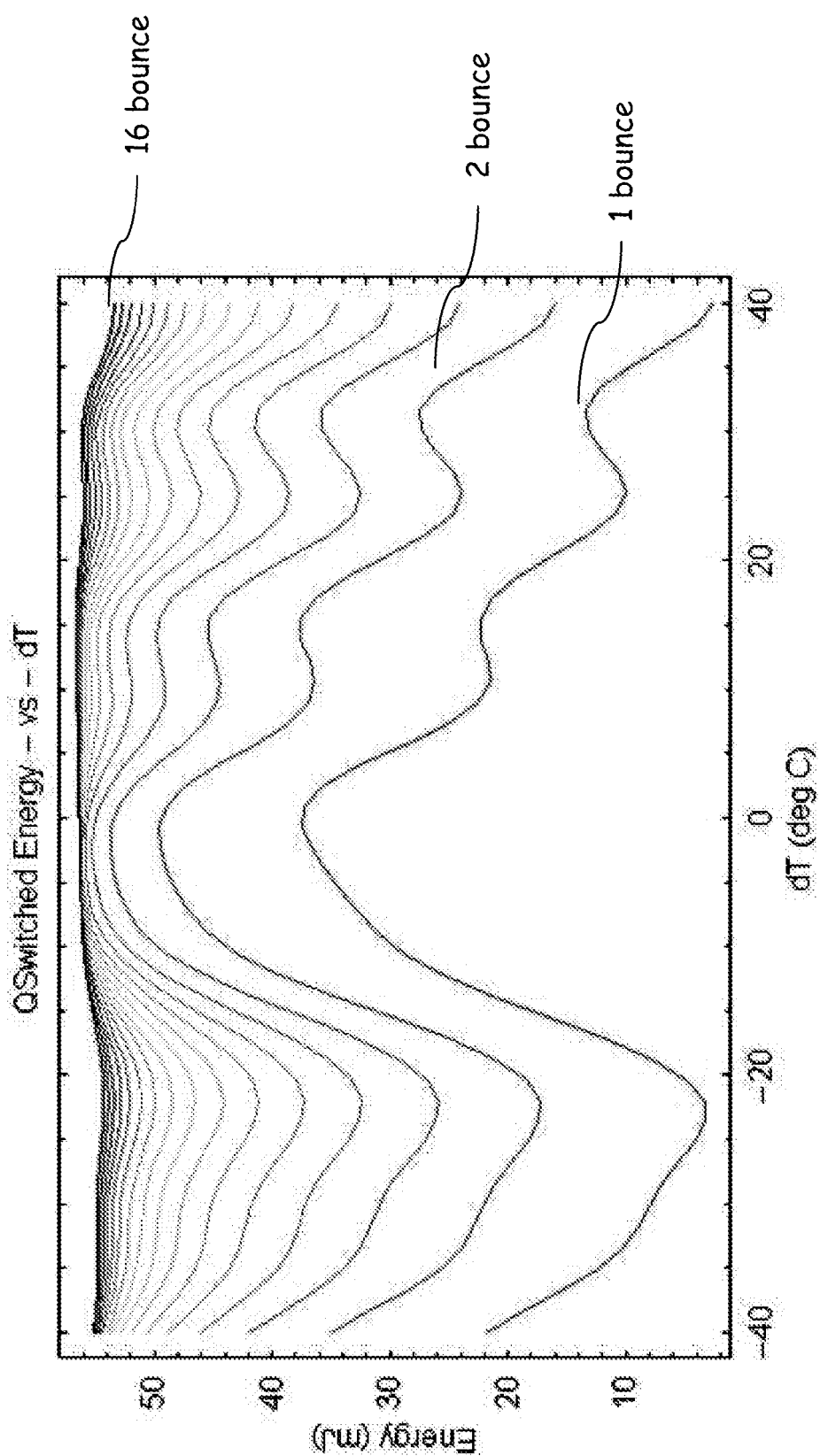

FIG. 15 shows relationships between the reflectivity of the output coupler of the resonator, the pulse energy output, and the drive current of the pump light source. FIG. 16 shows relationships between pulse energy output over a temperature range for configurations of the resonator utilizing different configurations of the pump light chamber 314*a-b* that provide different numbers of reflections (or "bounces") of the pump light through the gain medium 306. For configurations with at least 9 bounces within the pump chamber 314*a-b*, an output specification may be met for providing greater than 50 mJ of pulse output energy over a temperature range of −40 degrees Celsius to +40 degrees Celsius.

FIG. 17 shows specifications that may be met and/or exceeded with embodiments of a compact laser, as described further herein. For example, the compact laser may be optimized, using elements and configurations described further herein, to produce a compact laser designator meeting specifications in FIG. 17.

It is clear that many modifications and variations of this embodiment can be made by one skilled in the art without departing from the spirit of the novel art of this disclosure. While specific parameters, including doping, device configurations, parameters of components, time values, time periods, and thresholds may have been disclosed, other reference points can also be used. These modifications and variations do not depart from the broader spirit and scope of the present disclosure, and the examples cited here are illustrative rather than limiting.

What is claimed is:

1. A system comprising:
a non-planar laser ring resonator formed of a plurality of bulk components defining a resonant optical path with a preferred rotational direction and a non-preferred rotational direction for laser light travelling on the resonant optical path;
wherein the resonant optical path exists on at least two different planes; and
feedback means outside the non-planar laser ring resonator for feeding back radiation on a first plane of the at least two different planes travelling in the non-preferred rotational direction back into the non-planar laser ring resonator in the preferred rotational direction and on the first plane with polarization of the fed-back radiation matching a polarization of radiation travelling in the preferred rotational direction.

2. The system of claim 1, wherein the plurality of bulk components includes a Q-switch, and wherein the non-planar laser ring resonator is further adapted to use the feedback means to suppress initially lasing laser light propagation in the non-preferred rotational direction that is created during initial lasing following turning on of the Q-switch into a lower-loss state.

3. The system of claim 1, wherein the non-planar laser ring resonator is further adapted to use the feedback means via directing only a portion of the initially lasing laser light that is propagating in the non-preferred rotational direction out of a partially reflective output coupling mirror to the feedback means.

4. The system of claim 1, wherein the non-planar laser ring resonator is further adapted to output the portion of the initially lasing laser light out of the non-planar laser ring resonator to the feedback means via employing polarization discrimination between initially lasing laser light in the non-preferred rotational direction and initially lasing laser light in the preferred rotational direction.

5. The system of claim 4, wherein non-planar laser ring resonator is adapted to employ the polarization discrimination with a wave plate and a polarizer each included in the plurality of bulk components forming the non-planar laser ring resonator.

6. The system of claim 1, wherein the feedback means includes a reflective element, and a wave plate.

7. The system of claim 6, wherein the reflective element is partially reflective.

8. The system of claim 1, wherein the feedback means includes a corner cube and a wave plate.

* * * * *